(12) United States Patent
Barksdale et al.

(10) Patent No.: US 9,822,531 B2
(45) Date of Patent: Nov. 21, 2017

(54) THERMOPLASTIC FLASHING LAMINATE

(71) Applicant: FIRESTONE BUILDING PRODUCTS CO., LLC, Indianapolis, IN (US)

(72) Inventors: Daniel Leon Barksdale, Brownsburg, IN (US); Sean Christopher McCarthy, Noblesville, IN (US); Joseph John Kalwara, Indianapolis, IN (US)

(73) Assignee: Firestone Building Products Co., LLC, Nashville, TN (US)

( * ) Notice: Subject to any disclaimer, the term of this patent is extended or adjusted under 35 U.S.C. 154(b) by 0 days.

(21) Appl. No.: 15/195,032

(22) Filed: Jun. 28, 2016

(65) Prior Publication Data

US 2016/0305127 A1     Oct. 20, 2016

Related U.S. Application Data

(60) Continuation of application No. 14/816,342, filed on Aug. 3, 2015, now Pat. No. 9,404,268, which is a
(Continued)

(51) Int. Cl.
*E04D 5/00* (2006.01)
*E04D 5/14* (2006.01)
(Continued)

(52) U.S. Cl.
CPC ............. *E04D 5/12* (2013.01); *B32B 7/045* (2013.01); *B32B 7/06* (2013.01); *B32B 7/12* (2013.01); *B32B 15/08* (2013.01); *B32B 27/08* (2013.01); *B32B 27/10* (2013.01); *B32B 27/304* (2013.01); *B32B 27/32* (2013.01); *B32B 27/36* (2013.01); *C09J 7/021* (2013.01); *C09J 7/0267* (2013.01); *C09J 7/0271* (2013.01); *C09J 7/0278* (2013.01); *C09J 123/0815* (2013.01); *E04D 13/15* (2013.01); *E04D 13/155* (2013.01); *E04D 13/158* (2013.01); *B32B 2255/12* (2013.01);
(Continued)

(58) Field of Classification Search
CPC .. E04B 1/66; E04D 1/365; E04D 3/38; E04D 3/405; E04D 5/00; E04D 11/00; E04D 13/0315; E04D 13/14; E04D 13/1407; E04D 13/1415; E04D 2013/1422; E04F 17/026; E04F 19/02; Y10T 428/1476; Y10T 428/192; Y10T 428/24777; Y10T 428/14
USPC ...... 52/58, 408–413, 456, 461; 156/71, 227, 156/289
See application file for complete search history.

(56) References Cited

U.S. PATENT DOCUMENTS 4,493,175 A     1/1985   Coppola, Jr.
4,557,081 A  *  12/1985  Kelly ........................ E04D 5/14
                                                   52/199
(Continued)

*Primary Examiner* — Joshua J Michener
*Assistant Examiner* — Kyle Walraed-Sullivan
(74) *Attorney, Agent, or Firm* — Thomas R. Kingsbury; Arthur M. Reginelli

(57) ABSTRACT

A flashing laminate includes a non-reinforced thermoplastic sheet having a bottom surface, a first longitudinal edge, and a second longitudinal edge. The flashing laminate also includes an adhesive layer on a longitudinally extending portion of the bottom surface adjacent to one of the longitudinal edges. In one or more embodiments, the laminate also includes a release liner positioned over the adhesive tape.

14 Claims, 1 Drawing Sheet

Related U.S. Application Data division of application No. 12/878,191, filed on Sep. 9, 2010, now Pat. No. 9,127,460.

(60) Provisional application No. 61/240,691, filed on Sep. 9, 2009.

(51) Int. Cl.

| | | |
|---|---|---|
| *B32B 7/12* | (2006.01) |
| *E04D 5/12* | (2006.01) |
| *B32B 27/08* | (2006.01) |
| *C09J 7/02* | (2006.01) |
| *E04D 13/155* | (2006.01) |
| *E04D 13/158* | (2006.01) |
| *B32B 7/04* | (2006.01) |
| *B32B 7/06* | (2006.01) |
| *B32B 15/08* | (2006.01) |
| *B32B 27/10* | (2006.01) |
| *B32B 27/30* | (2006.01) |
| *B32B 27/32* | (2006.01) |
| *B32B 27/36* | (2006.01) |
| *C09J 123/08* | (2006.01) |
| *E04D 13/15* | (2006.01) |

(52) U.S. Cl.
CPC ... *B32B 2255/26* (2013.01); *B32B 2307/7265* (2013.01); *B32B 2405/00* (2013.01); *B32B 2419/06* (2013.01); *C09J 2201/28* (2013.01); *C09J 2423/006* (2013.01); *C09J 2427/006* (2013.01); *Y10T 428/1476* (2015.01)

(56) References Cited

U.S. PATENT DOCUMENTS

| | | | | |
|---|---|---|---|---|
| 4,588,637 A * | 5/1986 | Chiu | C09J 7/00 428/355 BL |
| 4,601,935 A * | 7/1986 | Metcalf | B32B 25/02 428/141 |
| 4,870,796 A * | 10/1989 | Hart | E04D 7/00 52/309.8 |
| 4,932,171 A | 6/1990 | Beattie | |
| 4,941,300 A | 7/1990 | Lyons, Jr. | |
| 4,963,219 A | 10/1990 | Nichols et al. | |
| 5,520,761 A * | 5/1996 | Kalwara | A47L 13/16 156/157 |
| 6,004,645 A * | 12/1999 | Hubbard | B32B 27/08 428/119 |
| 6,238,502 B1 | 5/2001 | Hubbard | |
| 6,442,904 B1 * | 9/2002 | Ortiz | E04D 13/0725 52/11 |
| 6,449,910 B1 | 9/2002 | Budd | |
| 6,696,125 B2 | 2/2004 | Zanchetta et al. | |
| 6,754,993 B1 | 6/2004 | Mayle et al. | |
| 6,904,731 B2 | 6/2005 | Wardle et al. | |
| 7,937,900 B1 * | 5/2011 | Gaffney | E04D 13/0305 52/200 |
| 8,297,020 B1 * | 10/2012 | Swanson | E04D 1/26 156/297 |
| 9,127,460 B2 * | 9/2015 | Barksdale | B32B 27/08 |
| 9,404,268 B2 * | 8/2016 | Barksdale | B32B 27/08 |
| 2003/0039789 A1 * | 2/2003 | Simpson | B32B 7/12 428/40.1 |
| 2004/0154265 A1 * | 8/2004 | Knowlton | E04B 1/66 52/741.1 |
| 2004/0157074 A1 * | 8/2004 | Hubbard | B29C 63/02 428/515 |
| 2007/0261346 A1 * | 11/2007 | Kelly | E04D 13/155 52/408 |
| 2008/0307734 A1 * | 12/2008 | Whelan | B29C 65/5042 52/411 |
| 2009/0057458 A1 * | 3/2009 | Fast | B65H 18/28 242/160.4 |
| 2009/0320987 A1 * | 12/2009 | Hubbard | B32B 7/06 156/71 |
| 2010/0119820 A1 * | 5/2010 | Ultsch | C08J 7/04 428/343 |
| 2010/0200148 A1 * | 8/2010 | Douglas | E04D 5/12 156/71 |

\* cited by examiner

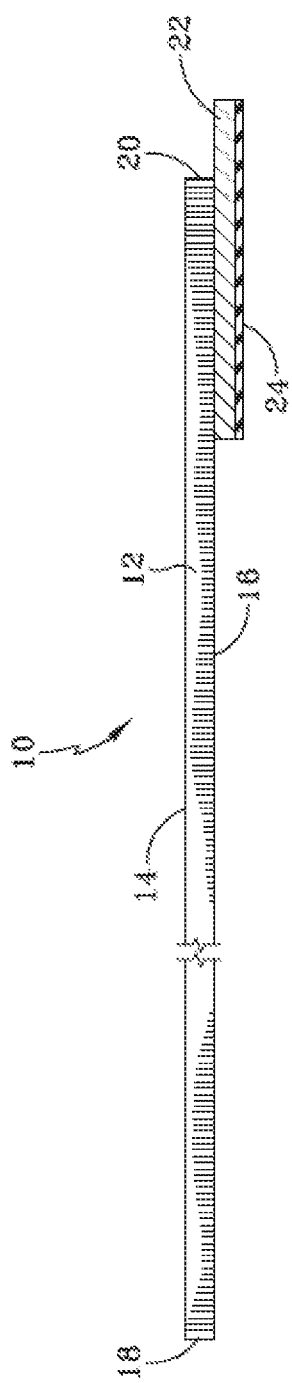
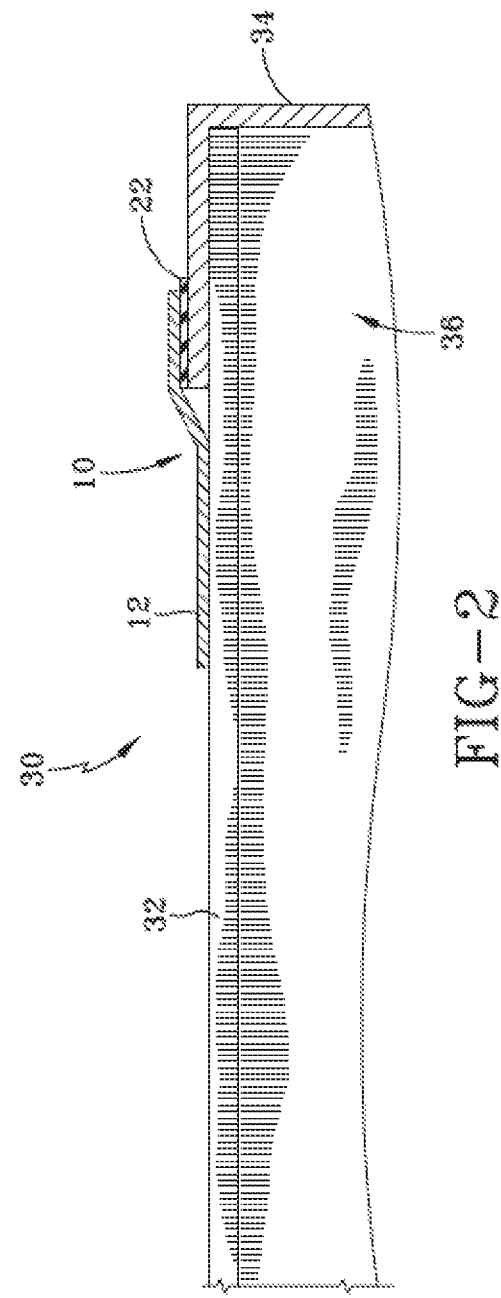

THERMOPLASTIC FLASHING LAMINATE

This application is a continuation application of U.S. Non-Provisional Ser. No. 14/816,342 filed on Aug. 3, 2015, which claims the benefit of U.S. Non-Provisional Ser. No. 12/878,191 filed on Sep. 9, 2010, and U.S. Provisional Patent Application Ser. No. 61/240,691, filed on Sep. 9, 2009, which are incorporated herein by reference.

FIELD OF THE INVENTION

One or more embodiments of the present invention relate to a non-reinforced thermoplastic flashing laminate having a pre-applied adhesive. More particularly, the non-reinforced thermoplastic flashing laminate includes an adhesive tape pre-applied to an edge portion of one surface of the laminate.

BACKGROUND OF THE INVENTION

The construction industry commonly uses single ply membranes to provide a waterproof barrier on flat or low-slope roofs. It is prohibitively expensive and difficult to produce and transport a single membrane that is sized to cover an entire roof surface, thus, a plurality of individual membranes are provided and oriented in an overlapping arrangement. The overlapping portions, or splices, of these individual membranes must be secured together to ensure that the plurality of membranes form a single waterproof surface. In addition, the outer edges of the membranes adjacent to the roof edge, as well as edges of the membrane surrounding objects on the roof surface, must be sealed in some manner to ensure that water does not intrude beneath the membranes.

In many cases, flashing is used to seal the edges of the roofing membranes. The flashing is similar to the single ply membranes used to cover the roof surface, but is provided in narrow strips and does not include reinforcements, such as a mesh fabric, which is provided in the membranes. Flashing, like the roofing membranes, may be provided as a thermoplastic material or a thermoset material. Thermoplastic flashings are capable of being heat welded to other thermoplastic materials, whereas thermoset materials require an adhesive bonding.

Both thermoplastic and thermoset flashings are available with or without a pre-applied adhesive. Thermoplastic flashings provided without an adhesive may be heat welded to other thermoplastic materials or may be adhered to other surfaces with adhesive bonding agents. Thermoset flashing provided without adhesive is adhered to other surfaces, including roofing membranes, by adhesives provided on site.

A common occurrence in roofing systems is the need to adhere flashing on one side to a thermoplastic membrane, and on another side to a metal or other non-heat weldable surface. The non-heat weldable surface may include an edge metal flashing (Gravel Stop), available under the trade names Firestone UNA-Edge, Firestone Drip Edge or Firestone Gravel Stop (Firestone). The non-heat weldable surfaces may also include a welded curb flange, flue flanges, or any other metal flanged penetrations. In addition, the non-heat weldable surface may be a thermoset membrane. Where a thermoplastic flashing is provided with a pre-applied adhesive on one surface, the adhesive binds the flashing both to the thermoplastic membrane as well as the non-heat weldable metal surface. Where a thermoset flashing is provided without a pre-applied adhesive, the flashing must be secured to both the thermoplastic membrane and the metal surface by an adhesive applied on site.

The ability to heat weld the thermoplastic flashing to the thermoplastic roofing membrane is advantageous in that it provides an excellent seal against water infiltration. Thus, a thermoplastic flashing without a pre-applied adhesive is attractive in that respect. However, the need to apply an adhesive on site between the thermoplastic flashing and the metal surface increases the labor, time, and cost involved in installation. Furthermore, conventional thermoplastic flashing assemblies require a termination bar or counter flashing at the edge of the thermoplastic flashing to provide a watertight seal, which is not provided by the bonding adhesive.

Thus, there exists a need in the art for a thermoplastic flashing laminate that is capable of providing a strong seal between a thermoplastic roofing membrane and a metal surface, while reducing the labor and costs involved in installation.

SUMMARY OF THE INVENTION

One or more embodiments of the present invention provide a flashing laminate including a thermoplastic sheet having a bottom surface, a first longitudinal edge, and a second longitudinal edge; and an adhesive layer on a longitudinally extending portion of the bottom surface adjacent one of the first longitudinal edge and the second longitudinal edge.

One or more embodiments of the present invention also provides a roofing assembly including a thermoplastic roofing membrane having a top surface and an outer edge portion; a non-heat-weldable surface adjacent the outer edge portion of the roofing membrane; and a flashing laminate including a non-reinforced thermoplastic sheet having a bottom surface, a first longitudinal edge, and a second longitudinal edge, and a pre-applied adhesive layer on a longitudinally extending portion of the bottom surface adjacent one of the first and second longitudinal edges, wherein the flashing laminate is heat welded to the outer edge portion of the roofing membrane and adhered to the non-heat-weldable surface by the adhesive layer.

One or more embodiments of the present invention also provides a method of installing flashing laminate between a thermoplastic roofing membrane and a non-heat-weldable surface, the method comprising: providing a flashing laminate having a non-reinforced thermoplastic sheet with a bottom surface, a first longitudinal edge and a second longitudinal edge, and adhesive layer on a longitudinally extending portion of the bottom surface adjacent the second longitudinal edge, and a release liner positioned over the adhesive layer; heat welding the bottom surface of the thermoplastic sheet to the thermoplastic roofing membrane along the first longitudinal edge; applying a primer to the non-heat-weldable surface and allowing the primer to dry; removing the release liner from the adhesive layer; and contacting the adhesive layer to the primed non-heat-weldable surface.

BRIEF DESCRIPTION OF THE DRAWINGS

FIG. 1 is a sectional view of a thermoplastic flashing laminate including a pre-applied adhesive tape;

FIG. 2 is a sectional view of a roofing assembly showing the thermoplastic flashing laminate installed between a thermoplastic roofing membrane and a metal surface (non heat weldable surface).

DETAILED DESCRIPTION OF THE ILLUSTRATIVE EMBODIMENTS

Referring now to FIG. 1, a thermoplastic flashing laminate is shown, and generally is indicated by the numeral 10. Thermoplastic laminate flashing 10 (also referred to as laminate 10) includes a thermoplastic sheet 12 having a top surface 14 and a bottom surface 16. In one or more embodiments, thermoplastic sheet 12 may be a non-reinforced thermoplastic sheet, meaning that it is devoid of any fabric reinforcement or mesh scrim. In one or more embodiments, thermoplastic sheet 12 also includes a first longitudinal edge 18 and a second longitudinal edge 20 positioned opposite first longitudinal edge 18. Laminate 10 may also include an adhesive tape 22 positioned on a portion of bottom surface 16 of thermoplastic sheet 12, and extending longitudinally adjacent a longitudinal edge of the thermoplastic sheet. While adhesive tape 22 is shown in FIG. 1 adjacent second longitudinal edge 20, it should be appreciated that adhesive tape 22 may alternately be provided adjacent first longitudinal edge 18. Adhesive tape 22 may be factory applied or factory laminated to thermoplastic sheet 12.

In one or more embodiments, thermoplastic sheet 12 is a narrow strip of a water-resistant single ply membrane. In certain embodiments, thermoplastic sheet 12 may be TPO based. In other embodiments, thermoplastic sheet 12 may be PVC based. Thermoplastic sheet 12, by virtue of its thermoplastic characteristics, is capable of being heat welded to another thermoplastic surface.

In one or more embodiments, thermoplastic sheet 12 may have a thickness of between approximately 0.010 and 0.100 inches, in other embodiments between approximately 0.020 and 0.080 inches, and in other embodiments between approximately 0.40 and 0.60 inches. In or more embodiments, thermoplastic sheet 12 may have a thickness of approximately 0.050 inches.

In one or more embodiments, thermoplastic sheet 12 may have a width, or distance between first longitudinal edge 18 and second longitudinal edge 20, of between approximately 0.1 feet and 8.0 feet, in other embodiments a width of between approximately 1.0 feet and 4.0 feet, in still other embodiments a width of between approximately 1.5 feet and 2.5 feet, and in yet other embodiments a width of approximately 2.0 feet. In one or more embodiments, thermoplastic sheet 12 may have a length in the longitudinal direction of between approximately 10 and 150 feet, and in other embodiments between approximately 50 and 100 feet. In one or more embodiments, thermoplastic sheet 12 may have a length of approximately 50 feet. In other embodiments, thermoplastic sheet 12 may have a length of approximately 100 feet.

In one or more embodiments, adhesive tape 22 extends along the entire longitudinal length of thermoplastic sheet 12. The term adhesive tape is used herein in a manner consistent with its usage in the art, and refers to any adhesive extrudate known to persons skilled in the art. The adhesive tape may include conventional adhesive tapes, including those that have EPDM and/or butyl rubber. Useful adhesive tapes are disclosed in U.S. Pat. Nos. 6,120,869; 5,888,602; 5,859,114; 5,733,621; 5,612,141; 5,563,217; 5,545,685; 5,504,136; 4,932,171; 4,855,172. 5,095,068 and 5,242,727, which are incorporated herein by reference. Useful tapes are commercially available including those available under the trade names PLIOSEAL™ (Ashland), 510™ (Adco), 505™ (Adco), 610™ (Adco), Pressure-Sensitive SecurTape™ (Carlisle), or QUICKSEAM™ (Firestone).

In one or more embodiments, adhesive tape 22 has a thickness of between approximately 0.020 and 0.080 inches, in other embodiments between approximately 0.040 and 0.050 inches, and in other embodiments a thickness of approximately 0.045 inches. In or more embodiments, adhesive tape 22 has a width of between approximately 2.0 and 12.0 inches, in other embodiments between approximately 5.0 and 8.0 inches, and in other embodiments a width of approximately 5.25 inches. The length of adhesive tape 22 varies depending upon the length of thermoplastic sheet 12.

In or more embodiments, a release liner 24 is provided over adhesive tape 22 until immediately prior to installation of laminate 10. Release liner 24 may include a thin film that the adhesive tape 22 may form a temporary bond with, but which bond can be readily broken by applying minimal tension. In one or more embodiments, release liner 24 may include a paper or cellulosic structure coated with a polymeric coating. In other embodiments, release liner 24 may include a homogeneous polymeric structure; for example, the release liner may include a polyester or polyolefin (e.g., polypropylene) film. Release liner 24 may advantageously provide protection to adhesive tape 22 during storage or shipment.

With reference now to FIG. 2, a portion of a roofing assembly is shown, the roof assembly being generally indicated by the numeral 30. Roofing assembly 30 includes a thermoplastic roof membrane 32 and an edge metal flashing (gravel stop) 34, both positioned on a roof surface 36. In one or more embodiments, thermoplastic roofing membrane 32 may be made of a TPO based material. In other embodiments, thermoplastic roofing membrane 32 may be made of a PVC based material. In any case, thermoplastic roofing membrane 32 is capable of being heat welded to another thermoplastic surface.

In one or more embodiments, edge metal flashing 34 is positioned over an edge portion of thermoplastic roofing membrane 32. In one or more embodiments, edge metal flashing 34 may be made of metal. In other embodiments, edge metal flashing 34 may be made of plastic or other non-heat-weldable materials. While the embodiment shown in FIG. 2 depicts an edge metal flashing 34, it is contemplated that laminate 10 may be used to form a seam between thermoplastic roofing membrane 32 and any non-heat-weldable surface, including, for example, other metal surfaces or thermoset membranes. For example, laminate 10 may be used to form a water impervious seam between thermoplastic roofing membrane 32 and an edge metal flashing extending around the edge of a roof surface.

Thermoplastic flashing laminate 10, as shown in FIG. 2, is heat welded to thermoplastic roofing membrane 32. Thus, a watertight seal is formed between non-reinforced thermoplastic sheet 12 and thermoplastic roofing membrane 32. Laminate 10 is also secured to edge metal flashing 34 by adhesive tape 22. Thus, a watertight seal is formed between non-reinforced thermoplastic sheet 12 and edge metal flashing 34 by virtue of adhesive tape 22. As can be seen, thermoplastic flashing laminate 10 allows for the creation of an effective seal around the edge of thermoplastic roofing membrane 32 in applications where it is also necessary to adhere laminate 10 to a non-heat-weldable material. Notably, no termination bar or counter flashing is required at the edge of non-reinforced thermoplastic sheet 12 due to the inclusion of the factory laminated adhesive tape 22.

In one or more embodiments, the method of installing thermoplastic flashing laminate 10 first includes the step of providing a thermoplastic flashing laminate having a non-reinforced thermoplastic sheet as well as an adhesive tape on a portion of the bottom surface thereof. In one or more embodiments, portion of the bottom surface of the thermoplastic sheet not having an adhesive tape thereon is then heat welded to a thermoplastic roofing membrane to create a watertight seal therebetween.

In one or more embodiments, a primer is then applied to a non-heat-weldable surface to which the laminate is to be adhered. A flash-off period may be required to allow the primer to dry. In one or more embodiments, a release liner is then removed from the adhesive tape of the laminate. In one or more embodiments, the adhesive tape is then placed in contact with the primed area of the surface to which the laminate is to be adhered, and pressure is applied to form an adhesive bond between the laminate and the non-heat-weldable surface.

Various modifications and alterations that do not depart from the scope and spirit of this invention will become apparent to those skilled in the art. This invention is not to be unduly limited to the illustrative embodiments set forth herein.

The invention claimed is:

1. A method of installing flashing laminate between a thermoplastic roofing membrane and a non-heat-weldable surface of a roof, the method comprising:
   providing a flashing laminate having a thermoplastic sheet with a bottom surface, a first longitudinal edge and a second longitudinal edge opposite said first longitudinal edge, an adhesive tape layer adhesively mated to a longitudinally extending portion of said bottom surface adjacent said second longitudinal edge, and a release liner positioned over said adhesive tape layer,
   wherein a portion of the adhesive tape layer adhesively mated to a longitudinally extending portion of said bottom surface adjacent said second longitudinal edge extends beyond said second longitudinal edge and wherein said adhesive tape layer is adhered to only a portion of said bottom surface of said thermoplastic sheet, thereby providing an exposed portion of said bottom surface of said thermoplastic sheet;
   heat welding said exposed portion of said bottom surface of said thermoplastic sheet to the thermoplastic roofing membrane along said first longitudinal edge of the thermoplastic sheet;
   applying a primer to the non-heat-weldable surface and allowing the primer to dry to thereby form a primed surface;
   removing said release liner from said adhesive tape layer; and
   mating said adhesive tape layer to said primed surface.

2. The method of claim 1, where non-heat-weldable surface extends along an edge of the roof.

3. The method of claim 2, where the non-heat-weldable surface is an edge metal flashing.

4. A roofing assembly comprising:
   a roof surface;
   an edge metal flashing extending along an edge of said roof surface;
   a thermoplastic roofing membrane having a top surface and an outer edge portion, where said thermoplastic roofing membrane is disposed over said roof surface;
   a flashing laminate including a thermoplastic sheet having a planar bottom surface extending uninterrupted from a first longitudinal edge to a second longitudinal edge, where said second longitudinal edge is opposite said first longitudinal edge, and a factory-applied adhesive tape layer adhesively mated to a longitudinally extending portion of said planar bottom surface adjacent to said second longitudinal edge, wherein a portion of said factory-applied adhesive tape layer extends beyond said second longitudinal edge of said thermoplastic sheet of said flashing laminate, wherein said flashing laminate is heat welded to said top surface of said thermoplastic roofing membrane at a location adjacent to said outer edge portion of said thermoplastic roofing membrane and adhered to said edge metal flashing by said factory-applied adhesive tape layer.

5. The roofing assembly of claim 4, wherein said thermoplastic sheet is made of a TPO based material.

6. The roofing assembly of claim 4, wherein said thermoplastic sheet is made of a PVC based material.

7. The roofing assembly of claim 4, wherein said factory-applied adhesive tape layer covers less than 50% of said bottom surface of said thermoplastic sheet.

8. The roofing assembly of claim 4, wherein said factory-applied adhesive tape layer covers less than 30% of said bottom surface of said thermoplastic sheet.

9. The roofing assembly of claim 4, wherein said flashing laminate has a width of between approximately 4.0 inches and 12.0 feet.

10. The roofing assembly of claim 4, where said roofing assembly is devoid of a termination bar or counter flashing where said roofing membrane is adhered to said edge metal flashing by said factory-applied adhesive tape layer.

11. The roofing assembly of claim 10, where said factory-applied adhesive tape layer has a thickness of 0.020 to 0.080 inches.

12. The roofing assembly of claim 11, where said factory-applied adhesive tape layer has a width of 2.0 to 12.0 inches.

13. The roofing assembly of claim 4, where the factory-applied adhesive tape layer includes EPDM or butyl rubber.

14. The roofing assembly of claim 13, where the thermoplastic roofing membrane has a thickness of from 0.020 to 0.080.

* * * * *